(12) United States Patent  
Campbell

(10) Patent No.: US 6,409,273 B1  
(45) Date of Patent: Jun. 25, 2002

(54) TRACKED MOTORIZED CARRIER WITH ACCESSORY ATTACHMENT DRIVE

(76) Inventor: Jeffery D. Campbell, 2686 N. Argyle St., #101, Fresno, CA (US) 93927

( * ) Notice: Subject to any disclaimer, the term of this patent is extended or adjusted under 35 U.S.C. 154(b) by 0 days.

(21) Appl. No.: 09/884,819

(22) Filed: Jun. 18, 2001

(51) Int. Cl.$^7$ ............................................. B62D 51/04
(52) U.S. Cl. ............................. 298/2; 298/1 C; 298/3; 298/7; 180/19.1; 280/47.31
(58) Field of Search ................. 298/2, 3, 1 C, 298/5, 7; 180/19.1, 19.3, 13; 280/653, 47.31, 47.23; 172/256

(56) References Cited

U.S. PATENT DOCUMENTS

| | | | | |
|---|---|---|---|---|
| 2,533,549 | A | * | 12/1950 | Bell ............................... 298/2 |
| 2,638,172 | A | * | 5/1953 | Borchin et al. ............. 298/3 X |
| 2,918,133 | A | * | 12/1959 | Ericsson .................... 298/2 X |
| 3,021,625 | A | * | 2/1962 | Stasse ........................... 298/2 |
| 3,323,837 | A | * | 6/1967 | Landry .......................... 298/2 |
| 3,791,470 | A | * | 2/1974 | Baddore et al. ............. 298/3 X |
| 4,270,786 | A | * | 6/1981 | Mattox .......................... 298/3 |
| 4,589,508 | A | * | 5/1986 | Hoover et al. ............. 180/19.1 |
| 4,645,264 | A | * | 2/1987 | Morrison .................... 298/1 H |
| 4,811,988 | A | * | 3/1989 | Immel ............................ 298/2 |
| 5,211,254 | A | * | 5/1993 | Harris, III et al. ......... 180/19.1 |
| 5,284,218 | A | * | 2/1994 | Rusher, Jr. ................. 298/2 X |
| 5,878,827 | A | * | 3/1999 | Fox ........................... 180/19.1 |

* cited by examiner

Primary Examiner—Stephen T. Gordon  
(74) Attorney, Agent, or Firm—Jeffrey A. Hall

(57) ABSTRACT

A tracked carrier(10) having a frame(6) and a handle(1) secured to the frame. The handle(1) has a proximal and a distal end thereto and may have a pair of downwardly depending support elements. The handle(1) has a brake lever(2) for controlling brakes mounted thereon. A first wheel(14) is secured to the distal end of the handle by frame elements and a pair of drive tracks secured to the proximal end of the handle by the frame elements. A drive engine(5) is mounted on the frame(6) and linked to the pair of drive tracks(16) by a drive mechanism. A throttle mechanism is operably engaged to the drive engine(5). A hydraulic pump (7) linked to an hydraulic drive motor. The hydraulic pump (7) is linked to a pair of drive track arm levers. An accessory hydraulic attachment valve(32) for attaching various mechanical devices, preferably with hydraulic hoses, is secured to the frame(6) and to a secondary hydraulic pump (36), and may accommodate operable linkage to various devices such as snowblowers, weed mowers, gardening plows, cultivator devices, scraping devices, augers, hydraulic mixers, carrier tubs, and other attachments.

3 Claims, 2 Drawing Sheets

TRACKED MOTORIZED CARRIER WITH ACCESSORY ATTACHMENT DRIVE

TECHNICAL FIELD

This invention relates transporting and carrying apparatuses such carriers and wheelbarrows, and more particularly to a tracked carrier which is equipped with an engine and drive means for propelling the carrier, and a accessory attachment valve for attaching various mechanical devices thereto.

BACKGROUND ART

The usefulness of carrying apparatuses such as wheelbarrows is well known to those involved in construction, gardening, and other uses where loads are moved and transported form one place to another. The wheelbarrow is a unique tool in that due to its single wheel design, a relatively heavy load may be balanced and moved. Wheelbarrows are also useful in that they may be used to move loads over rough and difficult terrain where other means of transport would be very difficult.

Heretofore, attempts have been made to power or motorize wheelbarrows by using gasoline powered engines in order to propel the wheelbarrow and load carried in the wheelbarrow. For example, U.S. Pat. No. 2,533,549 issued to Bell uses an air cooled gasoline motor and power transmission mechanism affixed to the wheelbarrow. U.S. Pat. No. 4,589,508 issued to Hoover et al. discloses a motorized wheelbarrow utilizing a gasoline engine which drives a front wheel through a friction drive transmission. The speed of the wheelbarrow is controlled by a throttle lever which is mounted on a handle of the wheelbarrow and is in combination with the friction drive lever which allows for the engine to be slowly and gradually engaged. U.S. Pat. No. 5,211,254 issued to Harris, III et al. discloses a motorized wheelbarrow using a displacement type engine and multi-speed transmission to drive the wheel of the wheelbarrow. U.S. Pat. No. 5,878,827 issued to Fox, discloses a motorized wheelbarrow with a rear wheel assembly. However, none of these devices show a means by which various attachments, for devices, such as snowblowers, augers, plows, or the like may be secured to and powered by the carrier or wheelbarrow.

Accordingly, it is the primary object of this invention to provide a tracked carrier which operates in a similar fashion to a wheelbarrow yet which is safer and more efficient on rough or uneven ground and which is lightweight, strong, balanced, and efficient at carrying and transporting a wide range of load sizes and weights. The tracked carrier of the present invention includes an accessory attachment valve for attaching various mechanical devices, preferably with hydraulic hoses, to the carrier. The tracked carrier of the present invention has high performance capability and possesses sufficient power to drive the carrier at both slow speeds or at high speeds with small, medium or large loads.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

DISCLOSURE OF INVENTION

To achieve the foregoing objects, and in accordance with the purpose of the invention as embodied and broadly described herein, a tracked carrier is provided having a frame and a handle secured to the frame. The handle has a proximal and a distal end thereto and a pair of downwardly depending support elements. The handle has a brake lever for controlling brakes mounted thereon. A first wheel is secured to the distal ends of the pair of handles by frame elements and a pair of drive tracks secured to the proximal ends of the pair of handles by the frame elements. A drive engine is mounted on said frame and linked to the pair of drive tracks by a drive mechanism. A hydraulic pump linked to an hydraulic drive motor. The hydraulic pump is linked to a pair of drive tracks arm levers. A throttle mechanism is operably engaged to the drive engine. An accessory attachment valve for attaching various mechanical devices, preferably with hydraulic hoses, to the carrier is secured to the frame and may accommodate operable linkage to various devices such as snowblowers, weed mowers, gardening plows, cultivator devices, scraping devices, augers, hydraulic mixers, and other attachments. Further, if desired, the tracked carrier of the present invention may be, through a hydraulic valve lever, operably linked to hand held hydraulic tools such as a hydraulic jack hammer, hydraulic chain saw, hydraulic drill, hydraulic saws and the like.

The tracked carrier of the present invention is lightweight, balanced, efficient, and highly effective at allowing a user to operate a wide variety of devices therefrom simply by attaching the device to the hydraulic attachment lever valve.

BRIEF DESCRIPTION OF DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

BEST MODE FOR CARRYING OUT THE INVENTION

Reference will now be made in detail to the present preferred embodiments of the invention as illustrated in the accompanying drawings.

In accordance with the present invention, there is provided in a preferred embodiment of the invention, a tracked carrier having a frame and a handle secured to the frame. The handle has a proximal and a distal end thereto and a pair of downwardly depending support elements. The handle has a brake lever for controlling brakes mounted thereon. A first wheel is secured to the distal ends of the handle by frame elements and a pair of drive tracks are secured to the proximal ends of the pair of handles by the frame elements.

A drive engine is mounted on said frame and linked to the pair of drive tracks by a drive mechanism. A hydraulic pump is linked to an hydraulic drive motor. The hydraulic pump is linked to a pair of drive tracks arm levers. A throttle mechanism is operably engaged to the drive engine. An accessory attachment valve for attaching various mechanical devices, preferably with hydraulic hoses, is secured to the frame and to a secondary hydraulic pump, and may accommodate operable linkage to various devices such as snowblowers, weed mowers, gardening. plows, cultivator devices, scraping devices, augers, hydraulic mixers, carrier tubs, and other attachments. Further, if desired, the tracked carrier of the present invention may be, through a hydraulic valve lever, operably linked to hand held hydraulic tools such as a hydraulic jack hammer, hydraulic chain saw, hydraulic drill, hydraulic saws and the like.

Figure 1:
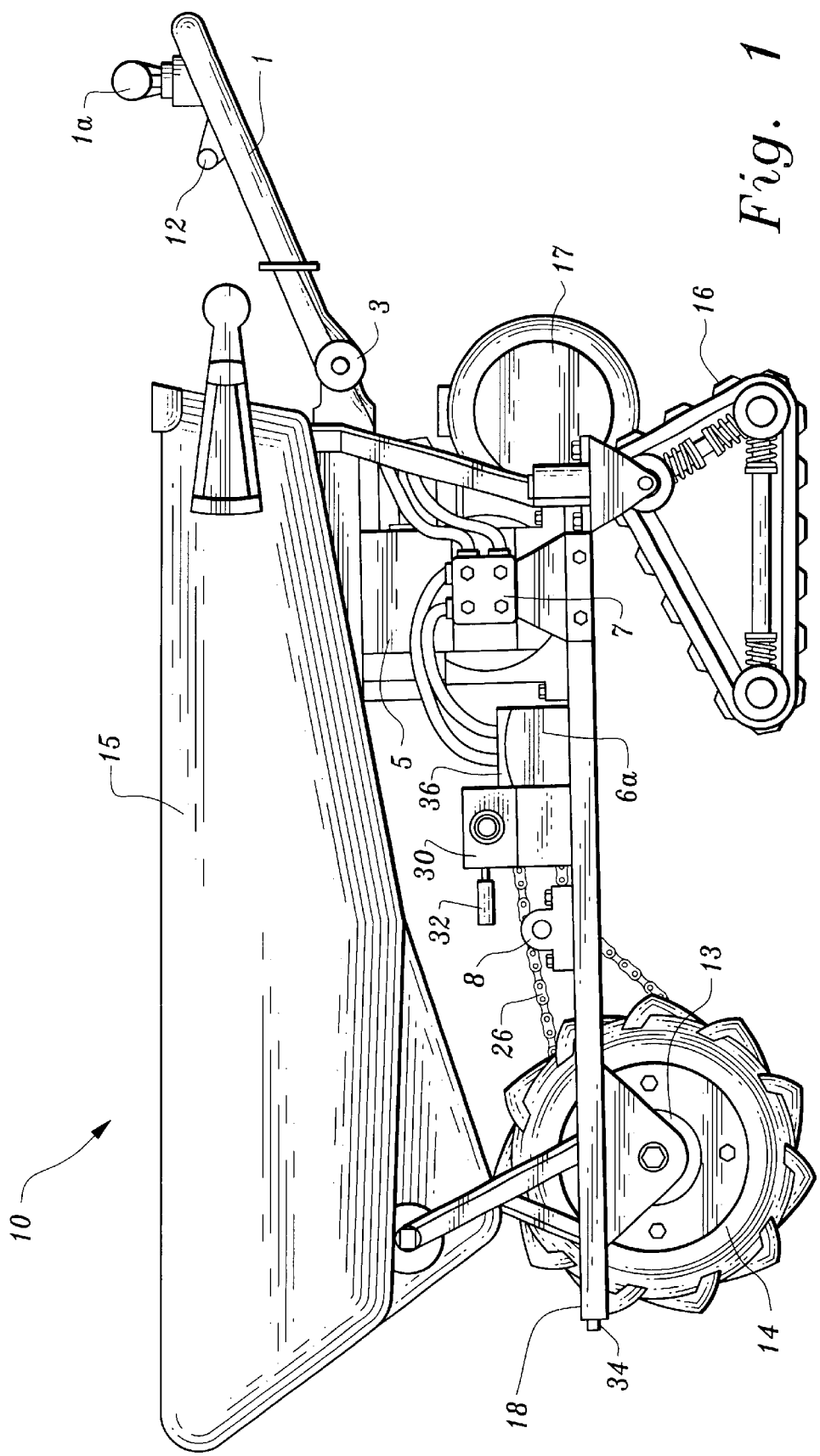
FIG. 1 is a side view of a tracked carrier with accessory attachment valve, according to the invention.

In FIG. 1, the tracked carrier 10, is shown according to a preferred embodiment of the invention with frame 6 with frame arms-elements. Carriage shaft bearings 8 and 8a are preferably secured to a rectangular frame element 18 by welding or mechanical fastening means such as bolts screws, nuts, or the like. A handle 1 is secured to frame 6 and preferably has a disc brake lever 2, with reversing control means secured thereto. A joystick valve lever la is operably secured to handle 1, as well as a forward and reverse valve lever 12, for controlling the forward and reverse movement of tracked carrier 10. Frame 6 may include elements which downwardly depend and may be used for additional support and stability. Handle 1 has a proximal and a distal end thereto and which are preferably provided with handle grips. An adjustable handlebar 3 is preferably secured to handle 1 by bolts, screws, or other mechanical fastening means. An engine kill switch 21 is also preferably mounted onto handle 1, and is operably linked to engine 5, mounted on frame 6.

Figure 2:
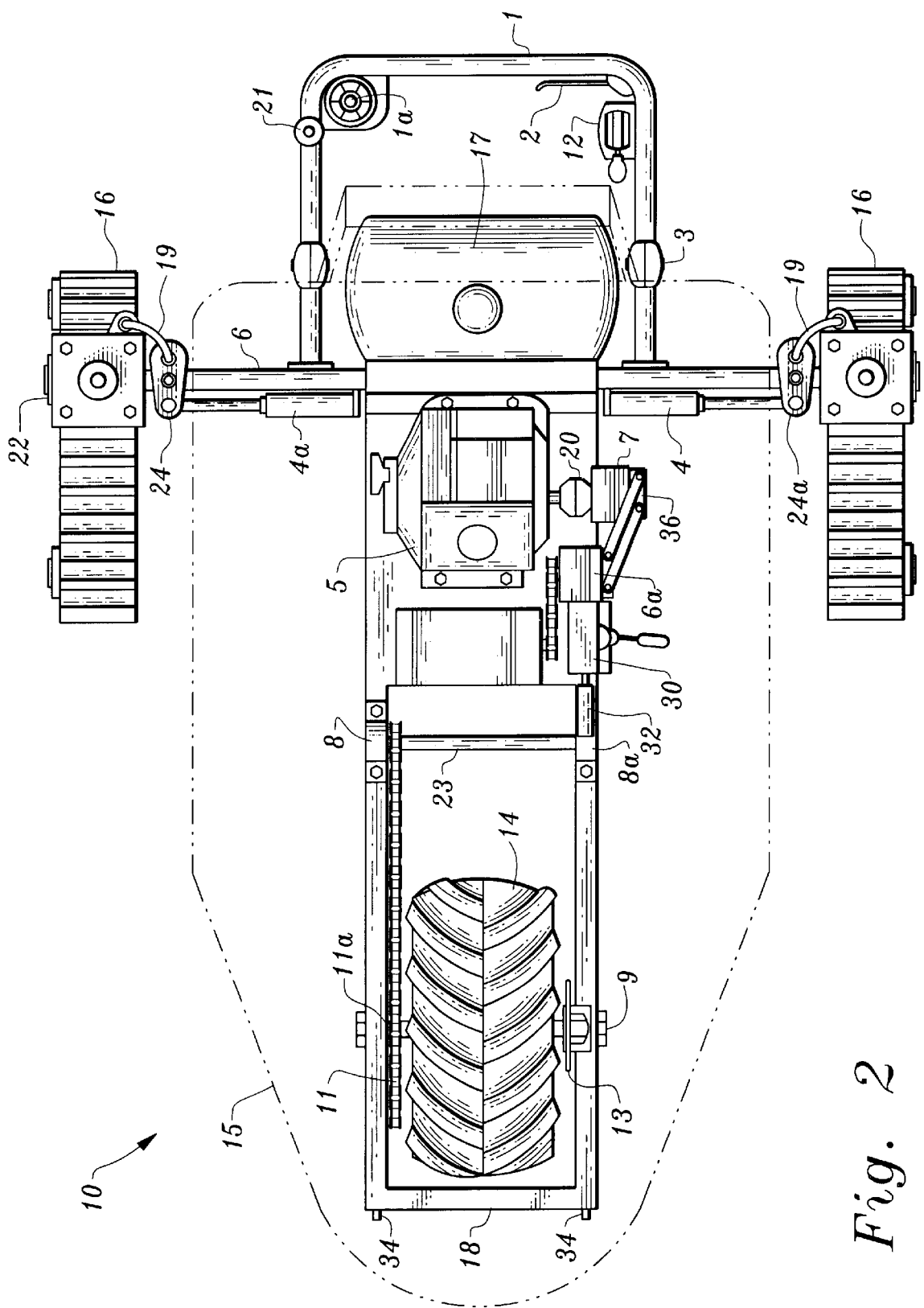
FIG. 2 is a top view of such tracked carrier with accessory valve, according to the invention.

As seen in FIGS. 1 and 2, tracked carrier is shown with a carrier tub 15, which is preferably composed of polyethylene, or other durable and resilient material is secured to handle 1, and frame 6, by bolts screws, welding, or other mechanical fastening means. Carrier tub 15 may be a load bucket as shown, or in alternative embodiments be a flat bed type load bucket or carrier, or otherwise configured as desired. However, carrier tub 15 is just one example of many devices which may be operably secured to frame 6. As seen in FIGS. 1 and 2, a hydraulic attachment lever valve 30 with quick disconnect fittings 32 is secured to frame 6. A secondary hydraulic pump 36 is operably linked to hydraulic attachment lever valve, preferably by hydraulic hoses. Hydraulic hoses from a variety of attachments such as snowblowers, weed mowers, gardening plows, cultivator devices, scraping devices, augers, hydraulic mixers, carrier tubs, and other attachments are simply plugged into 32. When hydraulic lever valve 30 is moved or flipped to an on position, this engages the attachments for operation. In some embodiments, frame mounts 34 may be variously positioned on the frame for securing the attachment thereto. In FIG. 2, frame mounts 34 are shown on the front end of frame 6. Further, if desired, the tracked carrier of the present invention may be, through a hydraulic valve lever, operably linked to hand held hydraulic tools such as a hydraulic jack hammer, hydraulic chain saw, hydraulic drill, hydraulic saws and the like.

In FIGS. 1, a first wheel 14 is secured to the distal ends of frame 6 and rectangular frame element 18. Wheel 14 preferably is a steel wheel with a pneumatic tire. Wheel 14 may be provided tracked as shown in FIG. 1, or as a conventional wheel. Wheel 14 is secured to axle rod 9 with a locking nut and includes disc brake caliper pads and disc 13, operably linked to disc brake lever 2, on handle 1. Wheel 14 is operably linked drive sprocket 11 with chain lla, linked to drive shaft. 23, which is operably linked to drive chain 26, which is driven by engine 5, which is preferably a gasoline powered engine, but may be otherwise.

Best seen in FIG. 1, hydraulic pump 7 is secured to frame 6 and operably linked to hydraulic motor 6a and to shaft coupling 20. Hydraulic cylinders 4 and 4a are secured to frame 6, and operably connected to hydraulic tank 17. Hydraulic cylinders 4 and 4a are also connected to rotating steering arms 24 and 24a, as shown. Rotating steering arms 24 and 24a are each respectively secured to a steering arm 19, which in turn is operably secured to a track 16. A track 16 is mounted on both sides of tracked carrier 10, so that a pair of tracks is used in the preferred embodiment as shown in FIG. 1. Tracks 16 include a hydraulic drive motor secured thereto and are operably connected to hydraulic pump 7 by tubing.

In operation and use tracked carrier 10 is very convenient, easy, reliable, and effective to use for use and operation of a wide variety of attachments such as snowblowers, weed mowers, gardening plows, cultivator devices, scraping devices, augers, hydraulic mixers, carrier tubs, and the like. In use, a user turns on kill switch 21 to the "on" position which allows electrical current to flow to gasoline engine 5. Shaft coupling 20 is driven which engages hydraulic pump 7. The user may choose to move tracked carrier 10 in either the forward or reverse direction and does this by manipulation of forward and reverse lever 12, which engages fluid from hydraulic pump 7, to hydraulic motor 6a and hydraulic motor 22. The user then depresses brake lever 2, which releases disc brake calipers 13. Drive sprocket 11 is then engaged by drive shaft 23, which engages drive sprocket 11, which engages wheel 14. Drive tracks 16 are engaged and hydraulic fluid travels to hydraulic cylinders 4 and 4a, which are used to manipulate and control the direction of drive track arm levers 19, which in turn control the direction of tracks 16. Hydraulic hoses from a variety of attachments such as snowblowers, weed mowers, gardening plows, cultivator devices, scraping devices, augers, hydraulic mixers, carrier tubs, and other attachments are simply plugged into 32. When hydraulic lever valve 30 is moved or flipped to an on position, this engages the attachments for operation.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

I claim:

1. A tracked carrier with an accessory attachment valve, comprising:
   a frame;
   a handle secured to said frame, said handle having a proximal and a distal end thereto and a pair of downwardly depending support elements; said handle having means for controlling brakes mounted thereon;

a first wheel secured to the distal end of said handle by frame elements;

a pair of drive tracks secured to the proximal end of the handle by frame elements;

a drive engine operably mounted on said frame and communicatively linked to said pair of drive tracks by a drive mechanism;

a hydraulic pump linked to a hydraulic drive motor, said hydraulic pump being operably linked to a pair of drive tracks arm levers;

a throttle mechanism being operably engaged to said drive engine;

a hydraulic attachment lever valve secured to said frame; and a secondary hydraulic pump operably linked to said hydraulic attachment lever valve.

2. The tracked carrier with accessory attachment valve of claim 1, wherein said drive engine is a gasoline powered engine.

3. The tracked carrier with accessory attachment valve of claim 1, wherein said frame includes frame mount elements.

* * * * *